Figure 1:
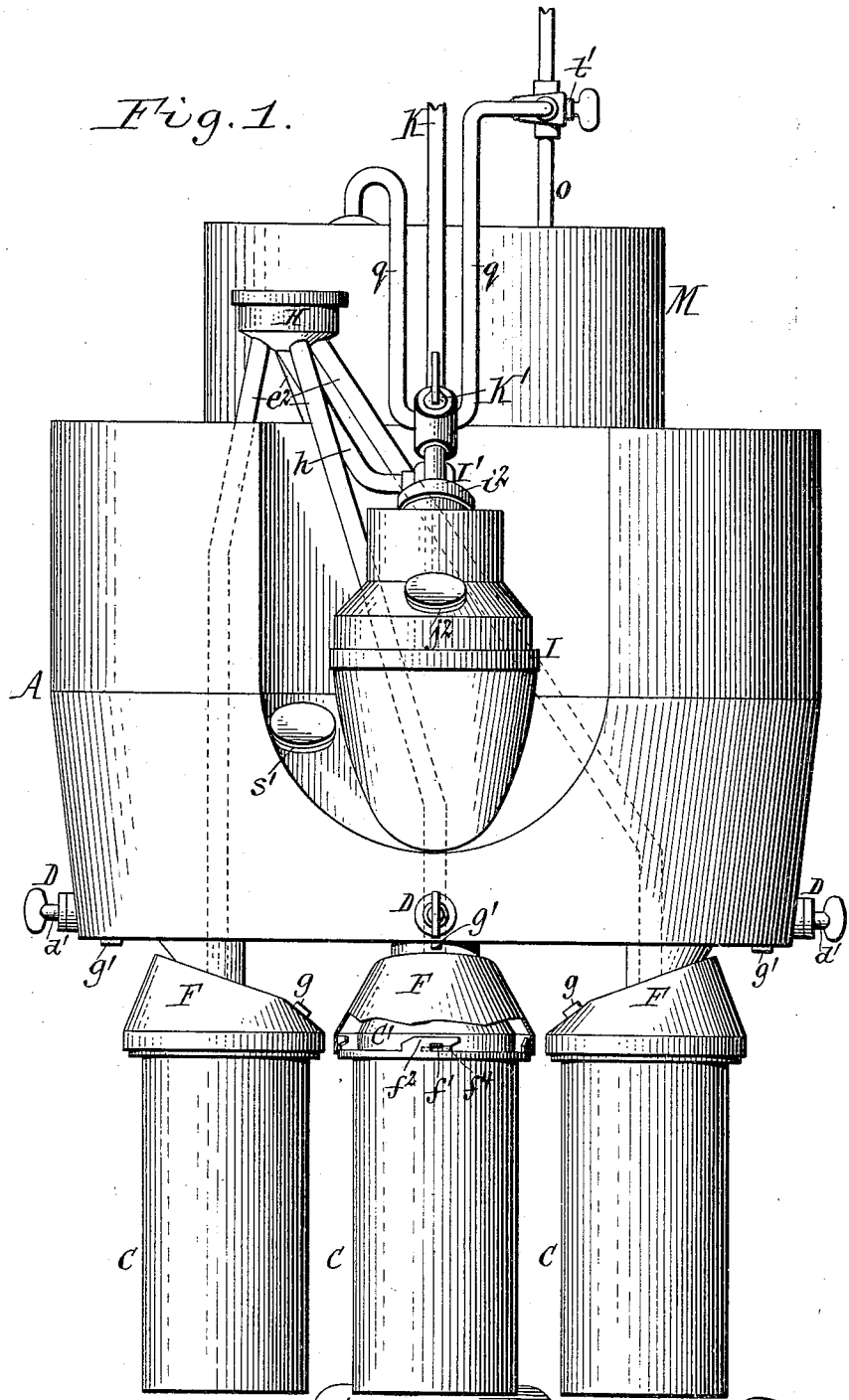

No. 768,830. PATENTED AUG. 30, 1904.
D. H. TREICHLER.
ACETYLENE GAS GENERATOR.
APPLICATION FILED JULY 5, 1902.
NO MODEL. 4 SHEETS—SHEET 1.

Witnesses:
Robert Weitknecht
Emma M Graham

D. H. Treichler
Inventor
By Geyer & Popp Attorneys.

No. 768,830. PATENTED AUG. 30, 1904.
D. H. TREICHLER.
ACETYLENE GAS GENERATOR.
APPLICATION FILED JULY 5, 1902.
NO MODEL. 4 SHEETS—SHEET 3.

Witnesses:
Robert Weitknecht
Emma M. Graham

D. H. Treichler, Inventor
By Geyer & Popp, Attorneys

No. 768,830. PATENTED AUG. 30, 1904.
D. H. TREICHLER.
ACETYLENE GAS GENERATOR.
APPLICATION FILED JULY 5, 1902.
NO MODEL. 4 SHEETS—SHEET 4.
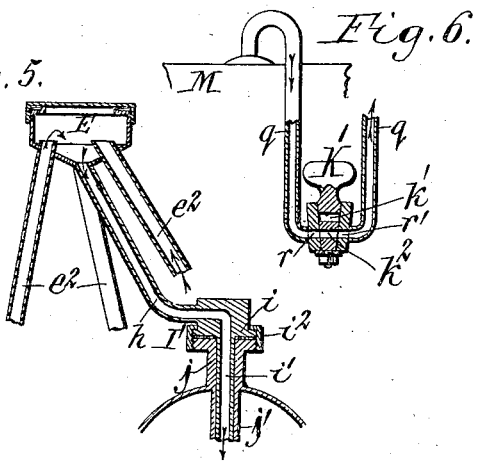
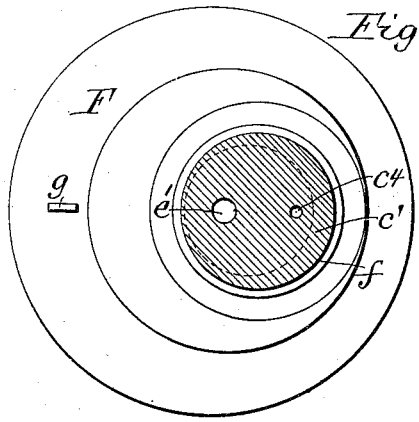
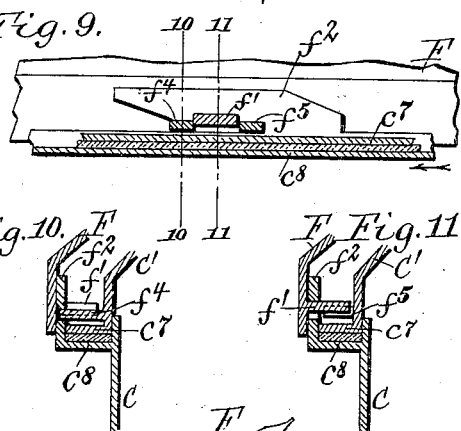
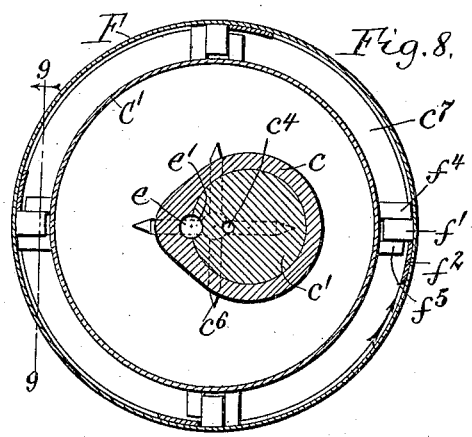
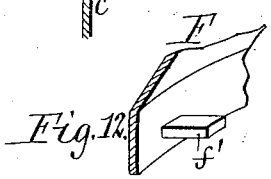
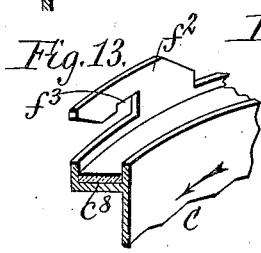
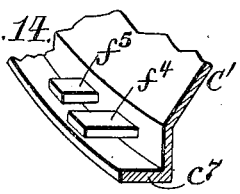
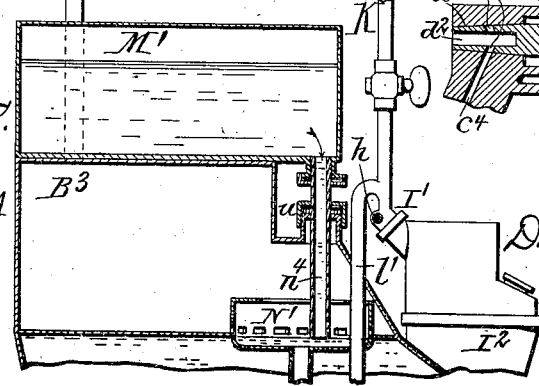
Witnesses:
Robert Weithnecht.
Emma M. Graham.
D. H. Treichler
Inventor
By Geyer & Popp
Attorneys.

No. 768,830.                                             Patented August 30, 1904.

UNITED STATES PATENT OFFICE.

DANIEL H. TREICHLER, OF NIAGARA FALLS, NEW YORK.

ACETYLENE-GAS GENERATOR.

SPECIFICATION forming part of Letters Patent No. 768,830, dated August 30, 1904.

Application filed July 5, 1902. Serial No. 114,454. (No model.)

*To all whom it may concern:*

Be it known that I, DANIEL H. TREICHLER, a citizen of the United States, residing at Niagara Falls, in the county of Niagara and State of New York, have invented new and useful Improvements in Acetylene-Gas Generators, of which the following is a specification.

This invention relates more particularly to improvements in acetylene-gas generators of the kind shown and described in Letters Patent of the United States Nos. 680,293 and 702,604, granted to me August 13, 1901, and June 17, 1902, respectively, the same being intended more especially for use in portable generators, although they are equally applicable to stationary generators.

One of the objects of my invention is to provide an ample and compact storage capacity for the after generation of gas without the use of a gasometer or other movable parts and without producing excessive fluctuations in pressure.

The invention has the further objects to provide simple means for preventing variation of the gas-pressure by the falling of the water-level in the main supply-tank; to provide the apparatus with a plurality of gas-generating chambers which are connected with a common water-feed and a common gas-delivery pipe in such manner that one or more of the chambers may be used as required; to removably attach the generating-chambers to their water and gas connections in such manner that any one of the same may be removed for cleaning and charging purposes without disturbing the others, and so that the connections to the chambers are automatically shut off in the act of removing the same.

Additional objects of my invention are to improve the construction of the gas-purifying chamber with a view of rendering it easily removable and accessible for cleaning, to facilitate the cleaning of other parts of the apparatus, and to improve the construction of the same in several other respects.

Figure 2:
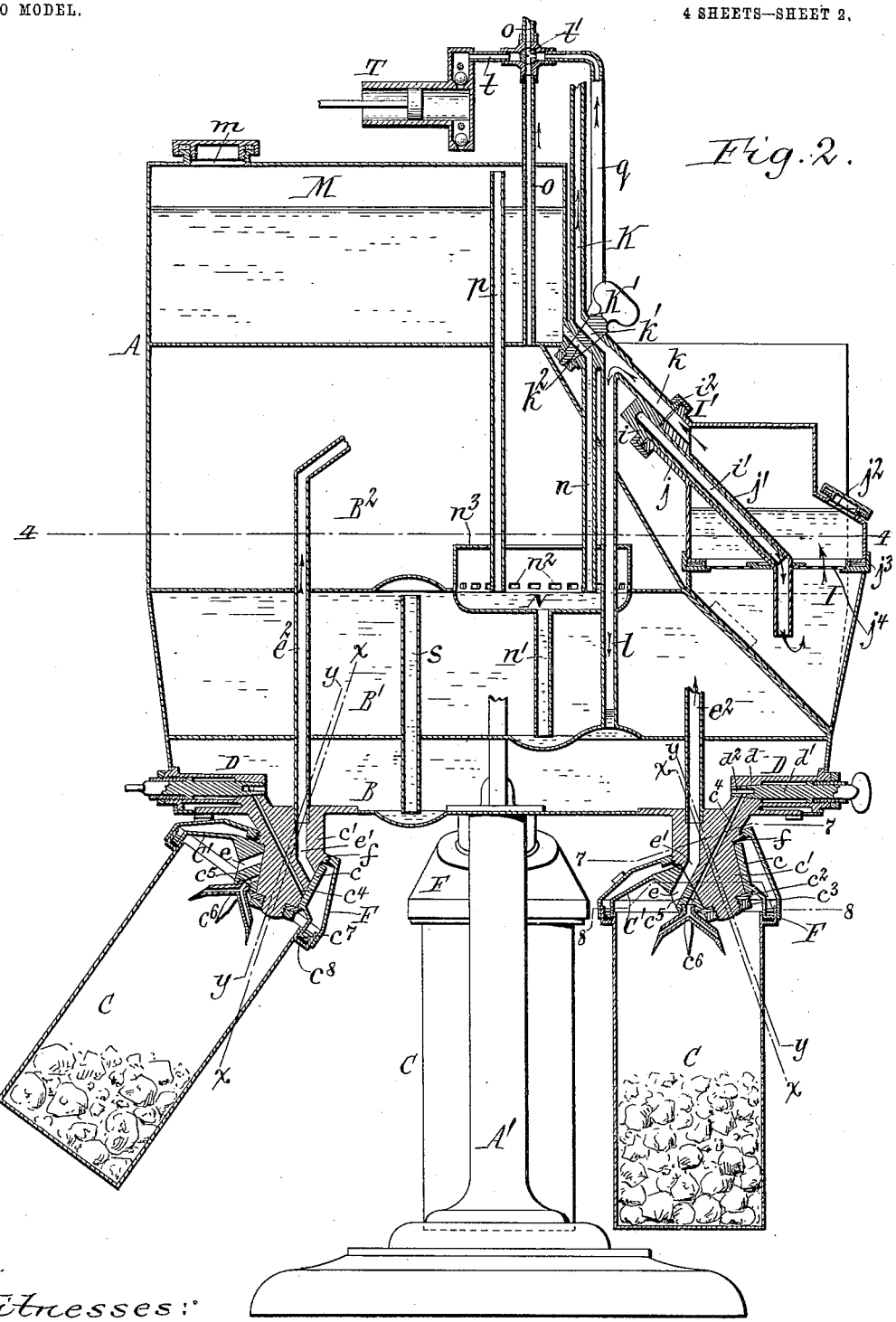
Figure 3:
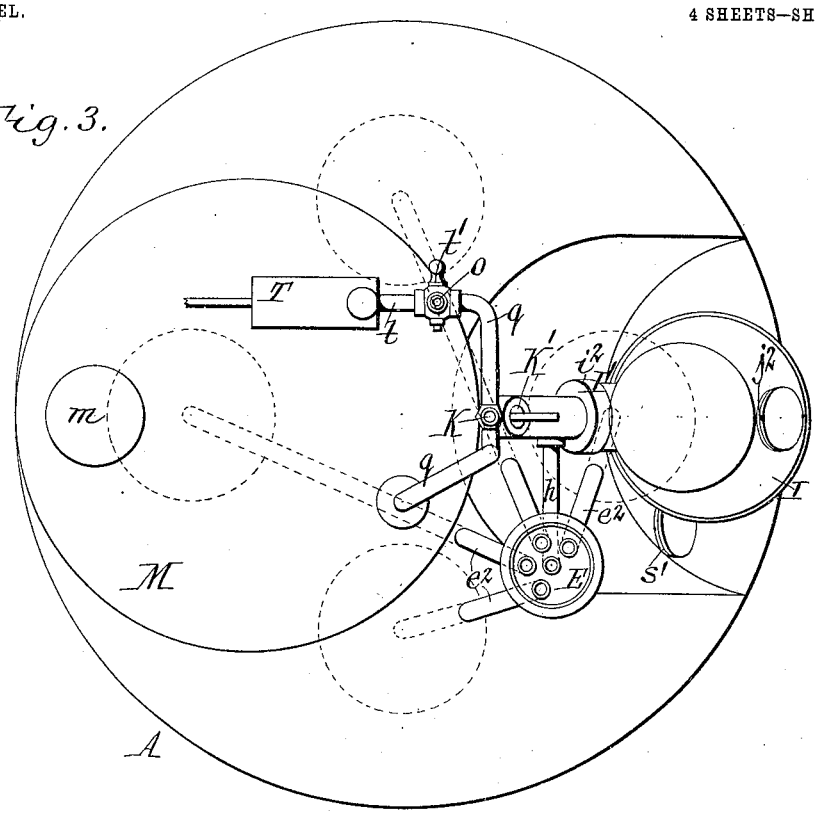
Figure 4:
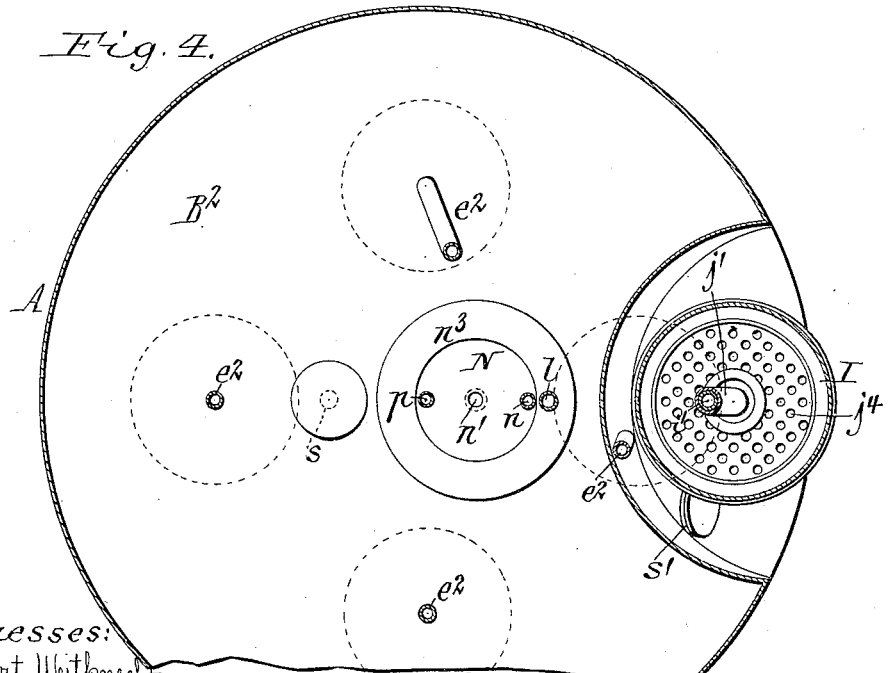

In the accompanying drawings, consisting of four sheets, Figure 1 is a side elevation of my improved generator with a portion of one of the generating-chambers broken away and shown in section. Fig. 2 is a vertical section of the same. Fig. 3 is a top plan view thereof with the cover of the condensing-manifold removed. Fig. 4 is a horizontal section in line 4 4, Fig. 2. Fig. 5 is a vertical section of the condensing-manifold and the union-joint at the top of the purifying-chamber. Fig. 6 is a longitudinal section of the main cut-off valve and the adjacent vent-pipes at right angles to Fig. 2. Figs. 7 and 8 are enlarged transverse sections in the correspondingly-numbered lines in Fig. 2. Fig. 9 is a vertical section, on an enlarged scale, in line 9 9, Fig. 8. Figs. 10 and 11 are longitudinal sections in lines 10 10 and 11 11, Fig. 9. Fig. 12 is a fragmentary perspective view of the clamping-yoke of one of the generating-chambers. Fig. 13 is a fragmentary perspective view of one of the generating-chambers, showing one of the bayonet-tongues at its upper end. Fig. 14 is a similar view of the cover of the generating-chamber. Fig. 15 is an enlarged longitudinal section of one of the feed-water valves. Fig. 16 is a vertical section of the vent-valve, showing the same in a different position from that illustrated in Fig. 2. Fig. 17 is a vertical section showing a modified construction of the apparatus.

Similar letters of reference indicate corresponding parts throughout the several views.

A indicates the main casing of the generator, which in the form of the apparatus shown in the drawings is mounted on a standard A', rising from a suitable base. This casing contains a plurality of superposed storage and water chambers B B' B², which will hereinafter be more fully described.

C indicates a plurality of independent gas-generating chambers adapted to contain a charge of carbid and depending from the lower storage-chamber B, from which they are directly supplied with water. Each of these generating-chambers is tightly closed at its upper end by a cover C', carrying a conical valve-case $c$, which is capable of rotating on a corresponding fixed valve plug or trunnion $c'$, depending from the under side of the lower storage-chamber B and upon which it is confined by a washer $c^2$ and nut $c^3$.

$c^4$ indicates a water-feed passage or port connected with the bottom of the lower storage-chamber B and extending obliquely through the valve-plug $c'$, and $c^5$ is a port extending through the valve-case and adapted to register with the plug-passage. This port terminates in a multiple drip-head $c^6$, arranged centrally in the upper portion of the generating-chamber and comprising a number of equidistant small-bored drip-nozzles which deliver the feed-water in drops upon the carbid. By employing such a multiple drip-head the water is distributed over the carbid, and yet a very small quantity is delivered upon any one place, thus preventing undue heating of the generated gas. The central stem of the drip-head may be screwed into a socket of the valve-case $c$ or otherwise removably attached thereto, so that the head and valve can be conveniently cleaned. The passage of the water to the drip-heads of the several gas-generating chambers is controlled by independent valves D, preferably of the rotary type, which are arranged horizontally in the lower portion of the lower storage-chamber B. The case of each of these valves is provided in its front portion with a tapering seat or bore $d$, which extends to the front end of the case and in which is fitted the tapering front portion of the rotary valve-plug $d'$. This tapering portion is provided with a longitudinal passage $d^2$, opening forwardly into the storage-chamber B and in diametrically opposite sides with ports $d^3$, either of which is adapted to register with the upper end of the feed-passage $c^4$ of the fixed valve-plug $c'$, as shown in Figs. 2 and 15, for conducting water to the drip-head $c^6$. The rear end of the rotary valve-plug $d'$ extends through a suitable stuffing-gland $d^4$ of the valve-case and terminates in an external knob or handle, as shown. This gland is screwed into the projecting outer end of the valve-case, and the plug is provided with a collar $d^5$, against which the gland bears for forcing the plug into its seat. The gland is held in place by a jam-nut $d^6$. By extending the main longitudial port of the plug to the front end of the latter the same forms the water-inlet passage of the valve, which passage can be readily cleaned upon removing the valve-plug. The gas generated in the carbid-chamber C is delivered through coinciding gas-ports $e$ $e'$, extending through the rotary valve-case $c$ and the fixed plug $c'$ and through a pipe $e^2$, leading from the plug-port, and ascending through the storage-chambers B B' B².

It will now be understood that by turning the gas-generating chamber C on the fixed valve-plug $c'$ the corresponding water and gas ports of the plug and its rotary case $c$ may be brought into or out of register for establishing or cutting off communication between the generating-chamber and the lower storage-chamber B and the gas-delivery pipe $e^2$, this being accomplished by a half-turn of the generating-chamber.

As shown in Figs. 2, 10, and 11, the cover C' of each generating-chamber has an outwardly-extending flange $c^7$, which is seated in an annular channel $c^8$ at the upper end of the chamber, a suitable packing being interposed between the parts to form a gas-tight joint. The cover is clamped upon the chamber, or, more properly speaking, the chamber is removably clamped against the under side of the non-removable cover by a rotary clamp yoke or hood F, having a screw-threaded opening which engages with an external screw-thread $f$ on the shank of the fixed plug $c'$. The rim of this clamping-yoke is provided on its inner side with radial lugs $f'$, preferably four, which interlock with horizontal tongues $f^2$, projecting upwardly from the outer flange of the sealing-channel $c^8$, practically forming bayonet-joints, as shown in Figs. 1, 9, 10, and 11. By this connection upon turning the generating-chamber forward in the direction of the arrows, Figs. 8, 9, and 13, the yoke, by reason of its screw-threaded connection with the plug $c'$, is caused to ascend on the latter, thereby drawing the channeled upper end of the generating-chamber toward the marginal flange of the cover C', compressing the packing and forming a gas-tight joint. Upon turning the generating-chamber in the reverse direction the yoke is screwed downwardly on the plug, releasing the chamber and permitting it to be removed from the cover by turning it with reference to the yoke sufficiently to disengage the members of the bayonet-joint. In order to positively interlock the lugs and tongues of these joints, the tongues are provided in their lower edge with square-ended notches $f^3$, in which the lugs of the yoke engage in clamping the generating-chamber to the cover and out of which they recede in releasing the chamber. The cover and the yoke are compelled to turn in unison by pairs of radial projections $f^4$ $f^5$, extending outwardly from the rim of the cover and straddling the yoke-lugs $f'$, as shown in Figs. 8 and 9. One of the projections of each pair, preferably the front lug $f^4$, is longer than the other and extends under the adjacent front end of the tongue $f^2$ of the generating-chamber, as shown in Figs. 1, 8, and 10, by which construction the cover assists the clamping-yoke in supporting the weight of the depending generating-chamber.

The clamping and releasing actions of the removable generating-chamber are effected by about a half-turn of the chamber in the proper direction, and the ports of the valve-plug $c'$ and its case $c$ are arranged in such relation that when the generating-chamber is turned into its normal or clamped position the ports come into register, while when the chamber is turned for releasing and removing it the ports break register. The water and gas connections are thus automatically closed and shut off from the generating-chamber in the act of removing the latter for recharging or cleaning it, and it is therefore impossible for the attendant to remove the chamber without at the same time closing the adjacent water and gas connections, thereby effectually guarding against the escape of gas and water from the apparatus under these conditions.

In order to facilitate the release of the clamped gas-generating chamber from its cover, the valve-plug $c'$ is preferably arranged in an inclined or more or less angular position with reference to the axis of the gas-generating chamber, as shown in Fig. 2. By this arrangement the generating-chamber has a crank-like movement on the plug which affords an increased leverage in turning the same on the plug from its normal to its abnormal position, permitting the chamber to be unclamped and clamped more easily than if the plug and the chamber were parallel. This construction also enables the gas-delivery passages $e\ e'$ to be extended through the valves $c\ c'$ in a nearly staight line, facilitating the cleaning of the same. This oblique arrangement of the valve-plug, however, reduces the effective lead or pitch of the screw-threaded joint between the yoke F and the plug, and in order to compensate for this reduction the axis of the screw-threaded portion of the plug is offset or arranged eccentrically to the main axis of the plug, as shown in Figs. 2 and 7, the relation of the two axes being indicated by the broken lines $x\ x$ and $y\ y$ in Fig. 2. Inasmuch as the plane of this eccentric screw-joint is at an angle to the plane of the joint between the generating-chamber and its cover, the effect of this combined eccentric and oblique arrangement of the screw-joint is to move the clamping-yoke up or down on the oblique valve-plug $c'$ upon turning the generating-chamber, thus tightening or releasing the latter. The vertical throw or shifting action of the eccentric screw-joint is increased as the inclination of the valve-plug approaches a horizontal position and diminished as the same approaches a vertical position. Suitable coöperating stops $g\ g'$ are preferably arranged on the yoke F and the main casing A for limiting the turning movement of the generating-chamber.

The apparatus shown in the drawings is provided with four generating-chambers; but a greater or less number may be employed, if desired.

The lower ends of the gas-delivery pipes $e^2$ are arranged closely to the drip-heads $c^6$, so that any water of condensation flowing down the same will be delivered upon the drip-nozzles and drop from the latter upon the carbid in the generating-chambers, together with the feed-water. These gas-delivery pipes extend upwardly to a common trap chamber or manifold H, which is arranged above the storage-chambers B B' B² and which in turn is connected by a condensation and gas pipe $h$ with a regulating, purifying, and cooling chamber I, containing water or other liquid. The gas-delivery pipes $e^2$ enter the bottom of the trap-manifold H and extend a short distance above the bottom, as shown in Fig. 5, to form traps or guards, which prevent any water of condensation that may collect in the manifold from flowing back through these pipes into the generating-chambers. The upper end of the gas-pipe $h$ is flush with the bottom of the manifold to allow any water in the latter to flow freely into the purifying-chamber I. By this construction the water of condensation coming from one generating-chamber is prevented from returning into one of the other chambers and effecting the gas-pressure by producing an excess generation. The trap-manifold has a removable top or cover, as shown, to facilitate cleaning it.

The lower end of the gas-pipe $h$ is connected with the interior of the purifying-chamber I by one member or nipple $i$ of a union-joint I'. This member is provided with a downwardly-extending tube $i'$, which telescopes into a nozzle $j$, projecting from the rear wall of the purifying-chamber, and a tube or sleeve $j'$, forming a continuation of the nozzle and terminating near the bottom of said chamber, so as to be submerged and seal the joint between the tubes for isolating the incoming gas from the outgoing purified gas. The nozzle $j$ is removably attached to the nipple $i$ of the gas-pipe $h$ by the screw-ring $i^2$ of the union-joint, so that upon unscrewing this ring the purifying-chamber can be removed for cleaning it. The tube $i'$ of the nipple $i$, the nozzle $j$, and the upper portion of the tube extension $j'$, which receives the tube $i'$, are arranged in an inclined position, while the bottom of the purifying-chamber and the contiguous upper side of the storage-chamber B' are inclined at the same angle as said tubes to permit the tubes to slip freely on each other in removing and replacing the purifying-chamber. The latter is supported on the sloping top of said storage-chamber and slides on the same in being removed and replaced. This inclined arrangement of the parts is necessary in order to allow the gas-inlet tubes to extend nearly to the bottom of the purifying-chamber and yet permit the removal of the latter. This chamber is filled through a capped opening $j^2$. To facilitate cleaning the chamber, it is preferably composed of two separable sections arranged one above the other and united by a screw-joint $j^3$, which is suitably packed, as shown in Fig. 2. The usual gas-dividing screen $j^4$ is extended across the purifying-chamber above the mouth of the telescopic gas-inlet tubes $i'\ j'$.

K indicates a gas-delivery passage leading from the top of the purifying-chamber and extending through the union-joint I'. With this passage the final gas-delivery pipe K of the apparatus is connected, which pipe contains a main cut-off valve K'. The union I' forms a connection for both the gas-inlet and gas-outlet pipes of the purifying-chamber, and this chamber can therefore be connected and disconnected from the apparatus by manipulating a single joint. From a point in the pipe K between its valve K' and the purifying-chamber a stand-pipe $l$ extends downwardly through the upper and intermediate storage-chambers $B^2$ B' and opens at its lower end into the lower storage-chamber B.

M is a main water-supply tank arranged at the top of the apparatus above the upper storage-chamber $B^2$. This tank is normally closed to the atmosphere and filled through a capped opening $m$.

N is a water basin or pan arranged in the bottom of the upper storage-chamber $B^2$ and receiving water from the supply-tank M through a descending pipe $n$, the open lower end of which extends into the basin. The passage of the water through this pipe is controlled by the valve K', which also controls the gas-delivery pipe K. The case of this valve has two sets of ports registering with the gas and water pipes K and $n$, respectively, as shown in Fig. 2, and the plug of the valve has corresponding ports $k'$ $k^2$, arranged in the same longitudinal plane of the plug, so that when this valve is opened water is supplied through the pipe at the same time that gas is allowed to pass through the delivery-pipe K, while upon closing the valve the gas and water supplies are simultaneously shut off. The basin N has a depending discharge-pipe $n'$, which opens into the bottom of the intermediate storage-chamber B'. It is also provided in its side about on a level with the bottom of the upper storage-chamber $B^2$ with apertures $n^2$, through which the water passes from said chamber into the basin, and vice versa. The basin is provided at its upper edge with an inwardly-extending guard-flange $n^3$, which prevents the water in the basin from dashing too freely into the upper storage-chamber in case the apparatus should be jolted or carelessly handled, thereby preventing marked changes or disturbances of the water-level in the basin and objectionable variations of gas-pressure which would result therefrom. The top of the basin opens into the upper storage-chamber $B^2$, and the latter communicates normally with the atmosphere through a vent or safety pipe $o$, leading from the top of said chamber and extending above the main tank M.

$p$ is a pressure-equalizing pipe open at both ends and extending from the interior of the water-basin N to the upper portion of the water-supply tank M. The lower end of this pipe is sealed by the water in the basin, and as the latter is exposed to the atmosphere while the supply-tank M is normally cut off therefrom the atmospheric pressure prevents the descent of water from said tank into the basin, except when the water-level in the latter falls below the mouth of the equalizing-pipe $p$ and allows a bubble of air to pass through the same into the supply-tank. Whenever this occurs, water is allowed to flow from said tank into the basin through the pipe $n$ until the water-level in the basin again rises and seals the end of the equalizing-pipe. The latter is extended into the basin to the proper depth to maintain a water level or column of the desired height. The equalizing-pipe also serves as a water-conduit through which the water in the upper storage-chamber may be displaced into the main supply-tank M under an extraordinary after generation of gas. To permit the water to be displaced into the main supply-tank M, it is necessary to vent the latter in the closed position of the main water and gas supply valve K'. For this purpose the top of the supply-tank is connected with the main vent-pipe $o$ by an auxiliary vent-pipe or by-pass $q$, which communicates with ports $r$ $r'$, arranged in opposite sides of the case of the main water and gas supply valve K' in the plane of the water-port $k^2$ of its plug, but at right angles to the water-ports of the case, as shown in Fig. 6. By this arrangement when said main valve is open its water-port breaks register with the by-pass, while when said valve is closed its water-port registers therewith and places the supply-tank M in communication with the atmosphere. The water delivered into the intermediate storage-chamber B' flows into the lower storage-chamber B through an open-ended overflow-pipe $s$, extending from the top of the intermediate chamber to the bottom of the lower chamber. This intermediate chamber has a capped filling-opening $s'$ in its top.

T is an air-pump of any suitable construction by which air may be forced into the supply-tank M for placing the gas under increased pressure, if desired. The delivery-pipe $t$ of this pump is connected with the main vent-pipe $o$ by a three-way valve $t'$, which also connects the by-pass $q$ with said main pipe. When the plug of this valve is turned into the position shown in Fig. 2, it places the upper storage-chamber $B^2$ and the pipe leading to the supply-tank M in communication with the atmosphere and cuts off connection between the same and the air-pump T, while when the valve is turned to the position shown in Fig. 16 it shuts off said chamber and said pipe from the atmosphere and connects the same with the air-pump.

In preparing the generator for use the water-feed valves D are closed and the several generating-chambers C are filled two-thirds full of coarse carbid. Water is then poured through the filling-opening $s'$ of the intermediate storage-tank B' for filling the same and the lower storage-chamber B, the main cut-off valve K' having been previously turned to the open position (shown in Fig. 2) to place the lower storage-chamber B in communication with the atmosphere through the stand-pipe $l$, valve-port $k'$, and gas-delivery pipe K in order to vent said chamber and permit the water to enter it. In thus filling the generator the water overflows through the pipe $s$ and fills the lower storage-chamber B, the water rising in the stand-pipe $l$ to the same level as in the basin N. After filling the chambers B B' the filling-cap of the latter is tightly replaced and the main valve K turned to close the water-supply pipe $n$ and gas-delivery pipe K. The main water-supply tank is then filled and its cap tightly replaced, and the purifying-chamber is finally filled to the height of its filling-opening, which latter is then closed. The generator being now ready for use and the vent-valve $t'$ assumed to occupy the position in which it shuts off the pump T from the apparatus, as shown in Fig. 2, the generator is started by opening the main cut-off valve K and one or more of the water-feed valves D. The gas generated by the dripping of the water upon the carbid rises through the individual gas-delivery pipes $e^2$, passes into and through the trap-manifold H, and thence down the pipe $h$ and telescopic tubes $i''$ and $j''$ into the purifying-chamber, the gas ascending through the water in the latter and through the screen $j^4$. From this chamber the purified gas passes to the main delivery-pipe K. A portion of the gas also passes down the stand-pipe $l$, and in the normal operation of the apparatus depresses the water column therein nearly to its lower end, where the level of the column rises and falls as the gas-pressure fluctuates. As the gas must pass through the water column in the purifying-chamber before exerting its pressure upon the top of the column in the stand-pipe $l$, the gas-pressure against the top of the latter column is less than that against the lower end of the column in the feed-passages $c^5$. The preponderating pressure at the lower end of this feed-column therefore sustains the latter and acts to retard the delivery of the water upon the carbid, the flow being entirely shut off when the pressure exceeds the normal, as more fully explained in the Letters Patent hereinbefore referred to. When the gas-pressure becomes excessive, it forces the water in the stand-pipe $l$ below the top of the lower storage-chamber B and enters the latter, displacing the water therefrom into the intermediate storage-chamber B' through the overflow-pipe $s$ and from said intermediate chamber into the upper storage-chamber $B^2$ through the pipe $n'$. If after closing the main cut-off valve K' the after generation of gas should be so great as to wholly displace the water from the lower and intermediate chambers B B' into the upper chamber $B^2$, the gas will escape into the atmosphere through the safety or vent pipe $o$.

The purpose of the multiple storage-compartments B B' $B^2$ is to furnish an ample storage-chamber for the gas of after generation which has no movable parts and which reduces to a minimum the variations in pressure due to the displacement of the water from one compartment to another upon opening the main cut-off valve K after having stored gas in the apparatus. It will be seen that as the water is depressed in the lower chamber B it rises approximately an equal distance in the upper storage-chamber $B^2$, and when all of the water has been displaced from the chamber B the column of water in the pipe $s$ is displaced into the intermediate chamber B', depressing the water-level in the latter as the volume of gas increases. It follows that although the water is successively displaced from one chamber to that next above it the height of the water column does not vary materially and a practically uniform pressure is therefore maintained, which would not be the case if the water column gradually increased in height with the increasing gas-pressure.

As the intermediate storage-chamber B' is located below the intended water-level in the basin N and above the lower storage-chamber B, this space, which in other acetylene-gas generators has hitherto been wasted, is utilized for additional storage capacity without increasing the size of the apparatus.

In order to reduce the size of the generator as much as possible and secure a maximum storage capacity for after generation in a machine of a given size, it is desirable to utilize the main supply-tank M as part of the storage system. In case a very large volume of gas should be generated after shutting off the main valve K a portion of the water in the upper storage-chamber $B^2$ is displaced through the equalizing-pipe $p$ into the supply-tank M, the air being allowed to escape from the tank through the by-pass $q$, which under these conditions opens into the atmosphere.

It will be observed that if the upper storage-chamber $B^2$ is made about equal in capacity to the combined capacity of the lower and intermediate chambers and the water is displaced from the latter into the former said upper chamber and the pipe $p$ together form a water seal which prevents gas from entering the supply-tank M.

If the gas-pressure is to be governed by the water column in the stand-pipe $l$, the three-way valve $t'$ is turned to the position shown in Fig. 2; but if it is desired to increase the pressure above that afforded by this water column said valve is turned to the position shown in Fig. 16 for placing the upper storage-chamber $B^2$ and the pipe leading to the supply-tank M in communication with the air-pump T.

By controlling the delivery of the water from the main tank M pneumatically by means of the basin N and the delivery-pipe $n$, extending into the same, the height of the water column which terminates at the water-level of the basin remains practically unchanged in the normal operation of the apparatus, and the varying head of the water in the supply-tank due to the consumption of the water does not, therefore, effect the gas-pressure.

In the modified construction of the apparatus shown in Fig. 17 the main water-supply tank M' is removably mounted upon the upper storage-chamber B³, and its delivery-pipe $n^4$ is connected with the bottom of the tank and serves as a filler for the tank upon inverting the same, thus dispensing with a separate filling-opening in the top of the tank. The delivery and filling pipe extends through a stuffing-box or union $u$ in the top of the upper storage-chamber B³ and terminates in the basin N'. In this case the equalizing-pipe $p$ of the first-described construction is omitted and the delivery-pipe $n^4$ is utilized both as an air-passage for venting the supply-tank when the water-level in the basin uncovers the lower end of the pipe and as a water-conduit for supplying the basin. K² is the gas-delivery pipe connected with the purifying-chamber I² and the stand-pipe $l'$. In this construction no valve is employed for controlling the delivery of water from the supply-tank M'.

I claim as my invention—

1. The combination of a liquid-supply tank, a gas-generating chamber having a detachable cover, and a cut-off valve controlling the passage of liquid from said tank to said chamber said valve being constructed to open or close by a rotary movement of one of its members and said cover being arranged to rotate with the movable valve member, substantially as set forth.

2. The combination of a liquid-supply tank, a gas-generating chamber having a detachable cover, and a cut-off valve having a gas-exit port and a liquid-port connecting the supply-tank and generating-chamber, said valve being constructed to open and close said ports by a rotary movement of one of its members and said chamber and cover being constructed to rotate with said movable valve member for connecting or disconnecting the chamber and cover, substantially as set forth.

3. The combination of a liquid-supply tank, a stationary valve-plug having liquid-inlet and gas-exit ports, a rotary valve-case coöperating with said plug and carrying a cover, a gas-generating chamber bearing at its open end against said cover, and a clamping device separably interlocked with the generating-chamber and operating to clamp and release the latter with reference to its cover, substantially as set forth.

4. The combination of a liquid-supply tank, a stationary valve-plug having liquid-inlet and gas-exit ports, a rotary valve-case coöperating with said plug and carrying a cover, a gas-generating chamber bearing at its open end against said cover, and a rotary clamp separably interlocked with the gas-generating chamber and having a screw-threaded connection with said stationary plug, substantially as set forth.

5. The combination of a liquid-supply tank, a stationary valve-plug having liquid-inlet and gas-exit ports, a rotary valve-case coöperating with said plug and carrying a cover, a gas-generating chamber bearing at its open end against said cover, a rotary clamp separably interlocked with the gas-generating chamber and having a screw-threaded connection with said stationary plug, and means for compelling said valve-case to rotate with said clamp, substantially as set forth.

6. The combination of a liquid-supply tank, a stationary valve-plug having liquid-inlet and gas-exit ports, a rotary valve-case coöperating with said plug and carrying a cover, a gas-generating chamber bearing at its open end against said cover, and a rotary clamp interlocked with the gas-generating chamber by a bayonet-joint and having a screw-threaded connection with said stationary valve-plug, substantially as set forth.

7. The combination of a liquid-supply tank, a stationary valve-plug having liquid-inlet and gas-exit ports, a rotary valve-case coöperating with said plug and carrying a cover, a gas-generating chamber bearing against said cover and provided at its upper end with a horizontal tongue having a locking-notch, and a rotary clamping-yoke having a screw-threaded connection with said valve-plug and provided with a lug arranged to engage under said tongue and interlock with its notch, substantially as set forth.

8. The combination of a liquid-supply tank, a stationary valve-plug having liquid-inlet and gas-exit ports, a rotary valve-case coöperating with said plug and carrying a cover having projections on its rim, a gas-generating chamber bearing against said cover and provided at its upper end with horizontal tongues, and a rotary clamping-yoke having a screw-threaded connection with said valve-plug and provided with inwardly-extending lugs which interlock with said tongues and the projections of said cover, substantially as set forth.

9. The combination of a liquid-supply tank, a stationary valve-plug having liquid-inlet and gas-exit ports, a rotary valve-case coöperating with said plug and carrying a cover having projections on its rim, a gas-generating chamber bearing against said cover and provided at its upper end with tongues, and a rotary clamping-yoke having a screw-threaded connection with said valve-plug and provided with inwardly-extending lugs which interlock with said tongues and the projections of said cover, said projections being arranged in pairs which straddle the lugs of the clamping-yoke and one projection of each pair engaging under the adjacent tongue of the generating-chamber, substantially as set forth.

10. The combination of a liquid-supply tank, a stationary plug or trunnion, a cover capable of turning on said trunnion, a gas-generating chamber bearing at its open end against said cover, and a rotary clamp separably interlocked with the generating-chamber and movable on said trunnion toward and from said cover, substantially as set forth.

11. The combination of a liquid-supply tank, a stationary plug or trunnion, a cover capable of turning on said trunnion, a gas-generating chamber bearing at its open end against said cover and arranged at an angle to said trunnion, and a rotary clamp separably interlocked with the generating-chamber and movable on said trunnion toward and from said cover, substantially as set forth.

12. The combination of a liquid-supply tank, a stationary valve-plug having liquid-inlet and gas-exit ports, a rotary valve-case coöperating with said plug and carrying a cover, a gas-generating chamber bearing at its closed end against said cover and arranged at an angle to said plug, and a screw-clamp mounted on said plug and separably interlocked with the generating-chamber, substantially as set forth.

13. The combination of a liquid-supply tank, a stationary valve-plug having liquid-inlet and gas-exit ports, a rotary valve-case coöperating with said plug and carrying a cover, a gas-generating chamber bearing at its open end against said cover, and a rotary clamp separably interlocked with the gas-generating chamber and having a screw-threaded connection with said valve-plug, the latter being arranged obliquely to the axis of the generating-chamber and the axis of said screw-threaded connection being arranged eccentrically to the axis of said plug, substantially as set forth.

14. In an acetylene-gas generator, the combination of a water-chamber, a gas-generating chamber connected therewith by a feed-passage, a valve controlling said passage and comprising a case provided in its front portion with a tapering bore which opens into said water-chamber, and a tapering rotary plug seated in said bore and provided with a longitudinal passage which extends rearwardly from the front end of the plug and a lateral port communicating with said passage and adapted to register with said feed-passage, substantially as set forth.

15. The combination of a multiple storage-chamber for acetylene-gas generators comprising two or more compartments arranged at different elevations and connected by an overflow conduit or conduits, each extending from the bottom of one compartment to the top of the compartment next above it, a gas-generating chamber, a stand-pipe connected at its lower end with one of said compartments, and a gas-conduit connecting the generating-chamber with the upper end of the stand-pipe, substantially as set forth.

16. The combination of a multiple storage-chamber comprising two or more compartments arranged at different elevations and connected by an overflow conduit or conduits, each extending from the bottom of one compartment to the top of that next above it, a gas-generating chamber connected with the lower of said compartments, a stand-pipe connected at its lower end with said lower compartment, and a gas-conduit connecting the upper end of said stand-pipe with the generating-chamber, substantially as set forth.

17. The combination of a multiple storage-chamber comprising two or more compartments arranged at different elevations and connected by an overflow conduit or conduits, each extending from the bottom of one compartment to the top of that next above it, a gas-generating chamber connected with the lower of said compartments, a stand-pipe connected at its lower end with said lower compartment, a gas-conduit connecting the upper end of said stand-pipe with the generating-chamber, and means for venting said upper compartment, substantially as set forth.

18. The combination of a multiple storage-chamber comprising upper, lower and intermediate compartments, an overflow-conduit extending from the bottom of the lower compartment to the top of the intermediate compartment, a similar conduit extending from the bottom of the intermediate compartment to the upper compartment, a gas-generating chamber connected with said lower compartment, a stand-pipe having its lower end connected with said lower compartment, and a gas-conduit connecting the upper end of said stand-pipe with the generating-chamber, substantially as set forth.

19. The combination with a gas-generating chamber, of a pneumatic liquid-supply comprising a liquid chamber or basin connected with the generating-chamber and exposed to the atmosphere, a storage-chamber connected with said basin and adapted to deliver into the same any water displaced therefrom by gas-pressure, a closed supply-tank arranged above said basin or chamber, and a delivery-pipe extending from said supply-tank into said basin or chamber, substantially as set forth.

20. The combination of a multiple storage-chamber comprising upper, lower and intermediate compartments, an overflow pipe or pipes extending from the bottom of the lower compartment to the top of the intermediate compartment, a generating-chamber connected with the lower compartment, a supply-basin arranged in the upper compartment and exposed to the atmosphere, a delivery-pipe extending from said basin into the compartment below it, a main supply-tank arranged above said storage-chamber, and a delivery-pipe extending from said supply-tank into said basin, substantially as set forth.

21. The combination of a multiple storage-chamber comprising upper, lower and intermediate compartments, an overflow pipe or pipes extending from the bottom of the lower compartment to the top of the intermediate compartment, a generating-chamber connected with the lower compartment, a supply-basin arranged in the upper compartment and exposed to the atmosphere, a delivery-pipe extending from said basin into the compartment below it, a main supply-tank arranged above said storage-chamber, a delivery-pipe extending from said supply-tank into said basin, and an equalizing-pipe connecting said basin with said supply-tank, substantially as set forth.

22. The combination of a multiple storage-chamber comprising two or more compartments arranged at different elevations and connected by pipes each extending from one compartment to that next above it, a generating-chamber connected with the lower compartment, a supply-basin arranged in the upper compartment and provided in its wall with apertures through which liquid is allowed to pass from the upper compartment into the basin, and a main supply-tank arranged above said storage-chamber and having a delivery-pipe leading from its bottom into said basin, substantially as set forth.

23. The combination of a multiple storage-chamber comprising two or more compartments arranged at different elevations and connected by overflow-pipes each extending from one compartment to that next above it, a generating-chamber connected with the lower compartment, a supply-basin arranged in said multiple storage-chamber and provided at its upper end with an inwardly-extending guard-flange, and a main supply-tank arranged above said storage-chamber and having a delivery-pipe leading from its bottom into said basin, substantially as set forth.

24. The combination of a gas-generating chamber, a liquid-chamber communicating therewith and having a vent-pipe, an air-forcing device having its delivery-pipe connected with said vent-pipe, and a valve arranged at the junction of said vent-pipe and said delivery-pipe and arranged to connect said liquid-chamber with the vent-pipe and cut off the same from said air-forcing device in one position of the valve and to connect said chamber with the air-forcing device in a different position of the valve, substantially as set forth.

25. The combination of a gas-generating chamber having a gas-exit, a liquid-supply tank having a vent, a basin connected with said supply-tank and with said generating-chamber, a storage-chamber connected with said basin so that the latter receives any water displaced from the storage-chamber by gas-pressure, and a valve constructed so that in one position the same connects the liquid-tank with said basin, the generating-chamber with said exit and disconnects the liquid-tank from said vent, while in another position of said valve said connections are reversed, substantially as set forth.

Witness my hand this 1st day of July, 1902.

DANIEL H. TREICHLER.

Witnesses:
GEO. S. COWPER,
FRED WERNER.